United States Patent
Etchin et al.

(10) Patent No.: US 10,168,214 B2
(45) Date of Patent: Jan. 1, 2019

(54) METHOD OF ASSEMBLY AND MANUFACTURING OF PIEZO ACTUATED FABRY-PEROT INTERFEROMETER

(71) Applicant: TruTag Technologies, Inc., Kapolei, HI (US)

(72) Inventors: Sergey Etchin, Castro Valley, CA (US); Hod Finkelstein, El Cerrito, CA (US)

(73) Assignee: TruTag Technologies, Inc., Kapolei, HI (US)

( * ) Notice: Subject to any disclaimer, the term of this patent is extended or adjusted under 35 U.S.C. 154(b) by 116 days.

(21) Appl. No.: 15/137,810

(22) Filed: Apr. 25, 2016

(65) Prior Publication Data

US 2016/0349423 A1    Dec. 1, 2016

Related U.S. Application Data

(60) Provisional application No. 62/162,475, filed on May 15, 2015, provisional application No. 62/247,364, filed on Oct. 28, 2015.

(51) Int. Cl.
*G02B 27/00* (2006.01)
*G01J 3/45* (2006.01)
(Continued)

(52) U.S. Cl.
CPC .............. *G01J 3/45* (2013.01); *G01B 7/14* (2013.01); *G01J 3/26* (2013.01); *G02B 26/001* (2013.01)

(58) Field of Classification Search
CPC .... G01J 3/26; G01J 3/02; G01J 3/0256; G01J 3/45; G02B 26/001; G02B 27/00; G03G 2215/00616; G01B 2290/25; G01B 7/14; G01B 9/02; G01C 19/56; G01D 5/2417; Y10T 29/49826

See application file for complete search history.

(56) References Cited

U.S. PATENT DOCUMENTS 4,547,801 A    10/1985  Haisma
4,859,060 A *  8/1989  Katagiri ............... G01D 5/266
                                                    356/454

(Continued)

FOREIGN PATENT DOCUMENTS

JP    5170025         3/2013
WO    2013167811 A1  11/2013

OTHER PUBLICATIONS

Pi Blog. Piezo Design: Fundamentals of Piezoelectric Actuation; Forces and Stiffness. Piezo Mechanics Design Tutorial. 2012. [Retrieved Jun. 21, 2016]. Retrieved from internet: <http://www.piezo.ws/piezoelectric_actuator_tutorial/Piezo_Design_part3.php>.

(Continued)

*Primary Examiner* — Bumsuk Won
*Assistant Examiner* — Balram Parbadia
(74) *Attorney, Agent, or Firm* — Van Pelt, Yi & James LLP

(57) ABSTRACT

A device for tunable optical filter includes a substrate, one or more piezos, a bottom mirror, and a top mirror. The one or more piezos are placed on the substrate. The one or more piezos have a piezo thickness. The bottom mirror is placed on the substrate. The bottom mirror has a bottom mirror thickness greater than the piezo thickness. The top mirror is placed on the bottom mirror. The top mirror is attached to the one or more piezos.

27 Claims, 14 Drawing Sheets

(51) Int. Cl.
  *G01J 3/26* (2006.01)
  *G02B 26/00* (2006.01)
  *G01B 7/14* (2006.01)

(56) References Cited

U.S. PATENT DOCUMENTS

| | | |
|---|---|---|
| 5,550,373 A | 8/1996 | Cole |
| 6,546,798 B1 | 4/2003 | Waters et al. |
| 7,911,623 B2 | 3/2011 | Lin et al. |
| 2006/0221450 A1* | 10/2006 | Wang ................ G01J 3/02 359/584 |
| 2007/0242920 A1* | 10/2007 | Lin .................... G01J 3/26 385/27 |
| 2009/0040616 A1* | 2/2009 | Lin .................... G01J 3/02 359/579 |
| 2013/0038876 A1* | 2/2013 | Arakawa ........... B81B 7/0035 356/416 |
| 2015/0124263 A1 | 5/2015 | Antila et al. |

OTHER PUBLICATIONS

Hicks et al. "The application of capacitance micrometry to the control of Fabry-Perot etalons." Journal of Physics E: Scientific Instruments 17.1 (1984): 49.

\* cited by examiner

METHOD OF ASSEMBLY AND MANUFACTURING OF PIEZO ACTUATED FABRY-PEROT INTERFEROMETER

CROSS REFERENCE TO OTHER APPLICATIONS

This application claims priority to U.S. Provisional Patent Application No. 62/162,475 entitled METHOD OF ASSEMBLY AND MANUFACTURING OF PIEZO ACTUATED FABRY-PEROT INTERFEROMETER filed May 15, 2015 which is incorporated herein by reference for all purposes.

This application claims priority to U.S. Provisional Patent Application No. 62/247,364 entitled METHOD OF ASSEMBLY AND MANUFACTURING OF PIEZO ACTUATED FABRY-PEROT INTERFEROMETER filed Oct. 28, 2015 which is incorporated herein by reference for all purposes.

BACKGROUND OF THE INVENTION

Fabry-Perot etalons are used for filtering light. By adjusting the distance between the mirrors in a Fabry-Perot etalon, the filter can be tuned. Sweeping the filter in combination with a detector enables a measurement of a spectrum. However, typical Fabry-Perot etalons and detectors for spectrum measurements are expensive, so are not able to be used in low cost versions of measurement instruments.

BRIEF DESCRIPTION OF THE DRAWINGS

Various embodiments of the invention are disclosed in the following detailed description and the accompanying drawings.

DETAILED DESCRIPTION

Figure 1:
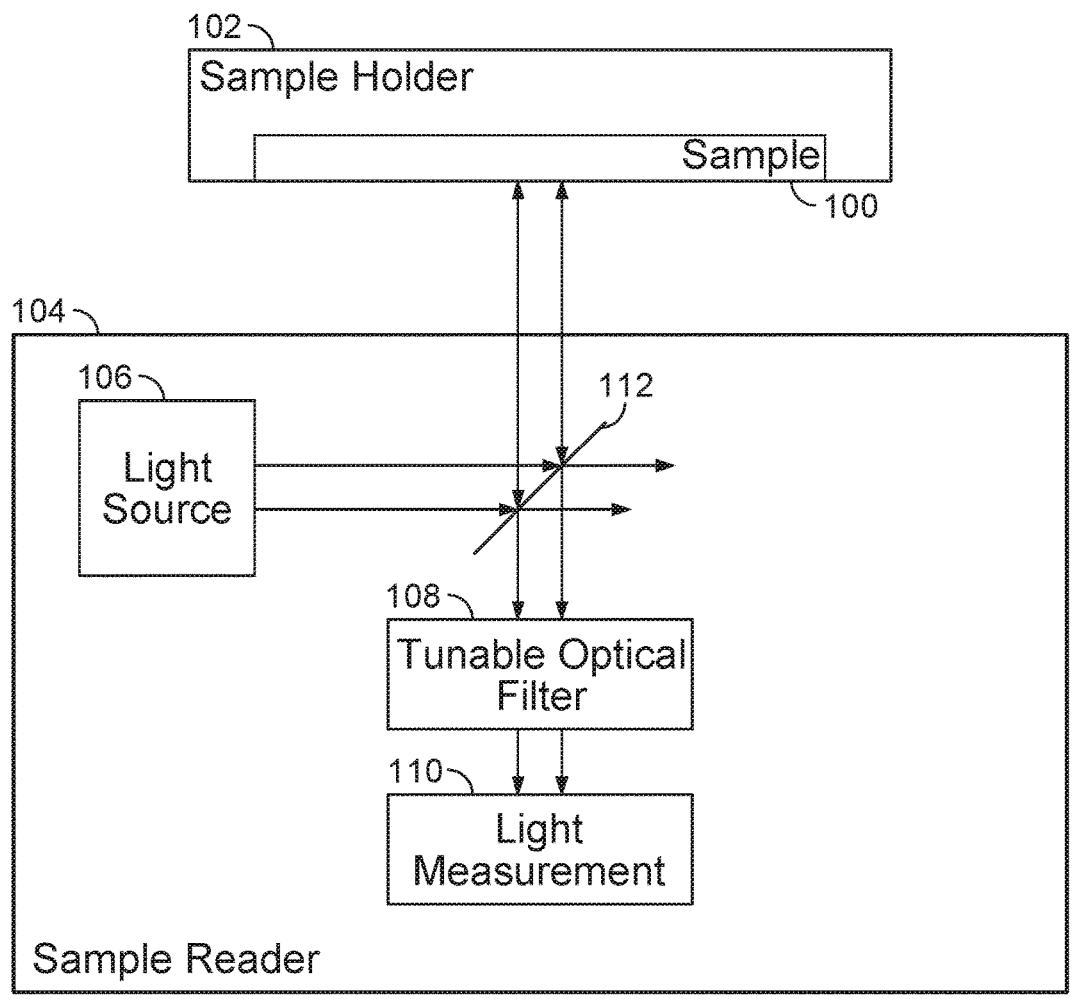
FIG. 1 is a block diagram illustrating an embodiment of an optical sample reader and a sample.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A device for tunable optical filter is disclosed. The device comprises a substrate, one or more piezos, wherein the one or more piezos are placed on the substrate, wherein the one or more piezos have a piezo thickness, a bottom mirror, wherein the bottom mirror is placed on the substrate, wherein the bottom mirror has a bottom mirror thickness greater than the piezo thickness, and a top mirror, wherein the top mirror is placed on the bottom mirror, wherein the top mirror is attached to the one or more piezos.

In some embodiments, a Fabry-Perot interferometer comprises part of a system for wide-range spectral measurement. The system for wide range spectral measurement comprises one or more broadband sources, the Fabry-Perot interferometer, a detector, and a sample holder. In some embodiments, the Fabry-Perot interferometer comprises an adjustable Fabry-Perot interferometer. The one or more broadband sources are to illuminate a sample. The adjustable Fabry-Perot interferometer filters the reflected light to extract spectral information with fine spectral resolution. The detector is to detect filtered light from the interferometer, wherein the filtered light is comprised of multiple spectral peaks corresponding to specific orders of multiple wavelengths and is optically processed using a plurality of settings for the adjustable Fabry-Perot interferometer. The plurality of settings is defined as the plurality of gaps between Fabry-Perot interferometer plates. For example, the tunable optical filter is tunable by setting one of a plurality of specific distances between Fabry-Perot interferometer plates that result in a transmission of light dependent on the distance between the plates. The sample holder is to hold the sample in the correct position for illumination and reflection of light to the detector.

In some embodiments, the Fabry-Perot etalon or interferometer is assembled and manufactured using high volume integrated circuit processes enabling low cost production. In addition, selection of the same or similar rectangular geometry for both the top and bottom mirrors of the Fabry-Perot etalon or interferometer enable efficient arrangement or placement of both top and bottom mirrors on a single substrate or matched production numbers with each mirror laid out on different wafers (e.g., same number of top mirrors as bottom mirrors on the different wafers). Positioning the two mirrors on top of each other and rotated 90 degrees to each other enables the positioning of the piezos adjacent to the bottom mirror and underneath the top mirror. Positioning the two mirrors on top of each other and rotated 90 degrees to each other enables the positioning of contact pads for electrical connections to sensors adjacent to the bottom mirror and not underneath the top mirror so that wires can access the contact pads. In some embodiments, the assembled configuration is designed so that only simple dicing of the mirrors is required for the adjustable Fabry-Perot interferometer or etalon.

In some embodiments, the assembly is made more efficient because the top mirror is able to lay flat on the bottom mirror—for example, because the piezo surfaces are beneath the plane of the top of the bottom mirror. In some embodiments, this is achieved using piezos with lower top surfaces than the bottom mirror when assembled (e.g., piezos with less thickness than bottom mirrors, bottom mirror elevated using spacers in the event that the piezos and mirror have the same thickness, etc.). In some embodiments, this is achieved using depressions to lower the top surface of the piezos compared to a top surface of a bottom mirror by lowering the substrate on which the piezos and the bottom mirror sit.

FIG. 1 is a block diagram illustrating an embodiment of an optical sample reader and a sample. In the example shown, sample 100 comprises a sample for optical detection of a spectral signature. In some embodiments, sample 100 comprises a tag. In some embodiments, sample 100 comprises an object comprising an item with a specific reflected spectrum (e.g., an item with a spectrally specific reflecting tag). Sample holder 102 comprises a sample holder for precisely holding the sample in place for measurement. Sample reader 104 comprises a sample reader for reading the sample. Sample reader 104 comprises light source 106. In some embodiments, light source 106 comprises a broadband light source. Light from light source 106 is projected at beam splitter 112. Beam splitter 112 comprises a beam splitter for reflecting incident light toward sample 100. In some embodiments, some light incident upon beam splitter 112 is transmitted (e.g., passes through beam splitter 112) and some light incident upon beam splitter 112 is reflected. In the example shown, some of the light from light source 106 passes straight through beam splitter 112 and is not used, and some light is reflected ninety degrees towards sample 100. In some embodiments, light exits sample reader 104 via a window. Light reflects off of sample 100 and re-enters sample reader 104 (e.g., via a window). After re-entering sample reader 104, the light encounters beam splitter 112 a second time. Some of the light is reflected (e.g., back towards light source 106) and some of the light is transmitted (e.g., passes straight through). Transmitted light enters tunable optical filter 108, and a subset of the light is able to pass through and exit tunable optical filter 108. In some embodiments, tunable optical filter 108 comprises a Fabry-Perot interferometer. In some embodiments, tunable optical filter 108 comprises a tunable frequency selector. In some embodiments, tunable optical filter 108 is configured in a reflection mode (e.g., reflected light hits tunable optical filter 108 and a subset of the light reflects off of its surface). Light passed by tunable optical filter 108 is detected and measured by light measurement 110. In some embodiments, a set of measurements is taken by light measurement 110 using different settings of tunable optical filter 108 to measure a reflected spectrum of sample 100.

In some embodiments, sample reader 104 includes a processor to receive measurement data from light measurement 110 (e.g., a signal from a detector that indicates an intensity of light measured). In some embodiments, a processor is used to indicate a frequency used by tunable optical filter 108. In some embodiments, a processor is used to turn on or off light source 106. In some embodiments, a capacitive sensor is used to measure the position of a top mirror with respect to a bottom mirror and enable proper positioning of the top mirror with respect to the bottom mirror (e.g., setting a distance between the two mirrors). In some embodiments, a processor receives one or more signals indicative of the measurement between the top and bottom mirrors (e.g., from one or more capacitive sensors) and these indications are used to determine a signal to feed to the piezos to properly set a distance between the two mirrors. In some embodiments, a closed loop control is used to set the distance between the mirrors based on the measurements of one or more sensors (e.g., capacitive sensors).

In some embodiments, a piezo comprises a piezoelectric actuator that changes height or thickness when a voltage is applied across the piezo. Note that electrical connections are not shown in the Figures herein for providing the voltage signal to the piezos. In some embodiments, electrical connections are attached to the top, bottom, or sides of the piezo for enabling causing of actuation.

Figure 2:
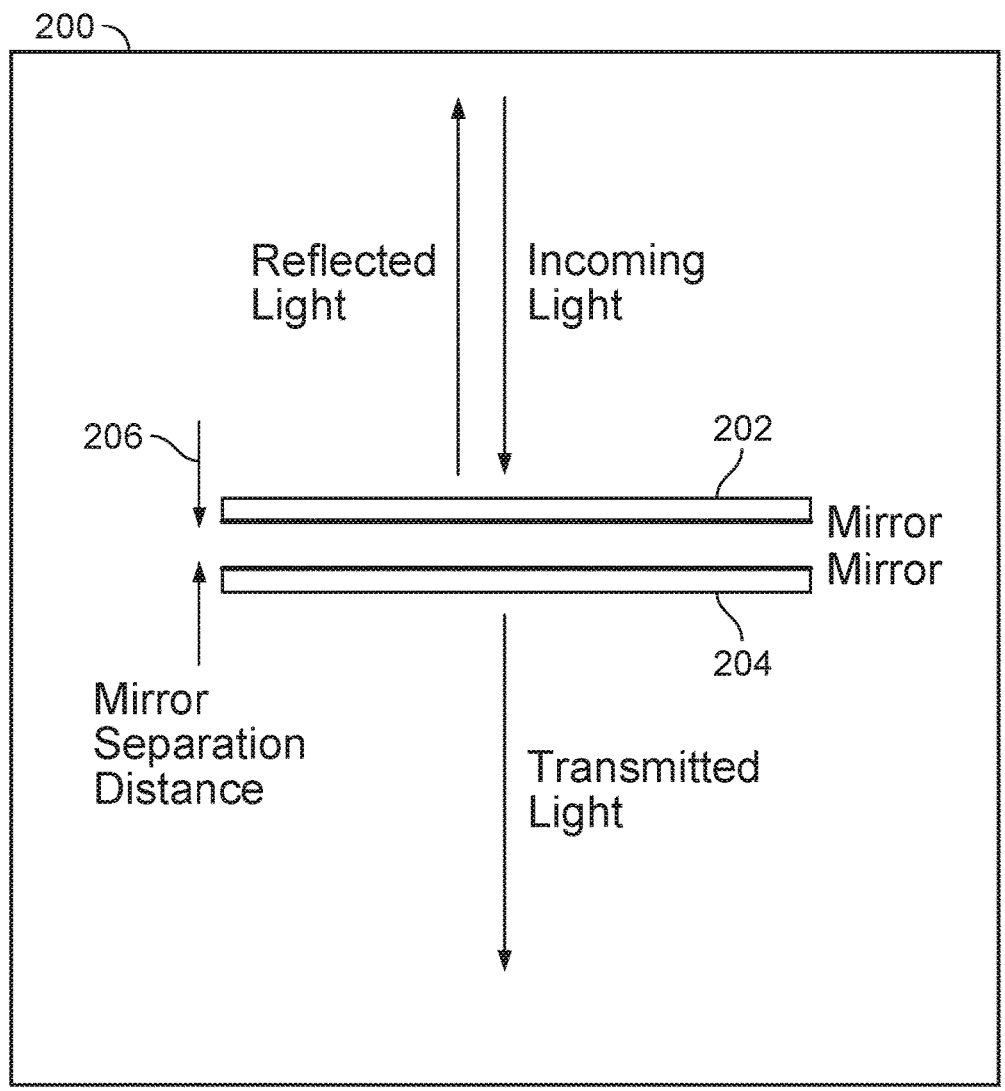
FIG. 2 is a block diagram illustrating an embodiment of Fabry-Perot interferometer.

FIG. 2 is a block diagram illustrating an embodiment of Fabry-Perot interferometer. In some embodiments, Fabry-Perot interferometer 200 comprises tunable optical filter 108 of FIG. 1. In the example shown, Fabry-Perot interferometer 200 comprises mirror 202 and mirror 204 separated by mirror separation distance 206. Mirror 204 and mirror 206 each have a partially reflecting surface—for example, a front surface of a substrate (e.g., a die of a wafer) is coated with a reflective coating such as a thin layer of silver. In some embodiments, a mirror silvering allows some light to be transmitted (e.g., to pass through the mirror silvering) and some light to be reflected. The mirror silvering of each of mirror 202 and mirror 204 is on the side nearer to the other mirror (e.g., on the bottom of mirror 202 and on the top of mirror 204). Light enters Fabry-Perot interferometer from the top. Incoming light encounters mirror 202 and mirror 204, and some light is reflected and some light is transmitted. As the light bounces between mirror 202 and mirror 204 constructive and destructive interference is created, causing the transmission and reflection properties of Fabry-Perot interferometer 200 to depend on mirror separation distance 206.

Figure 3A:
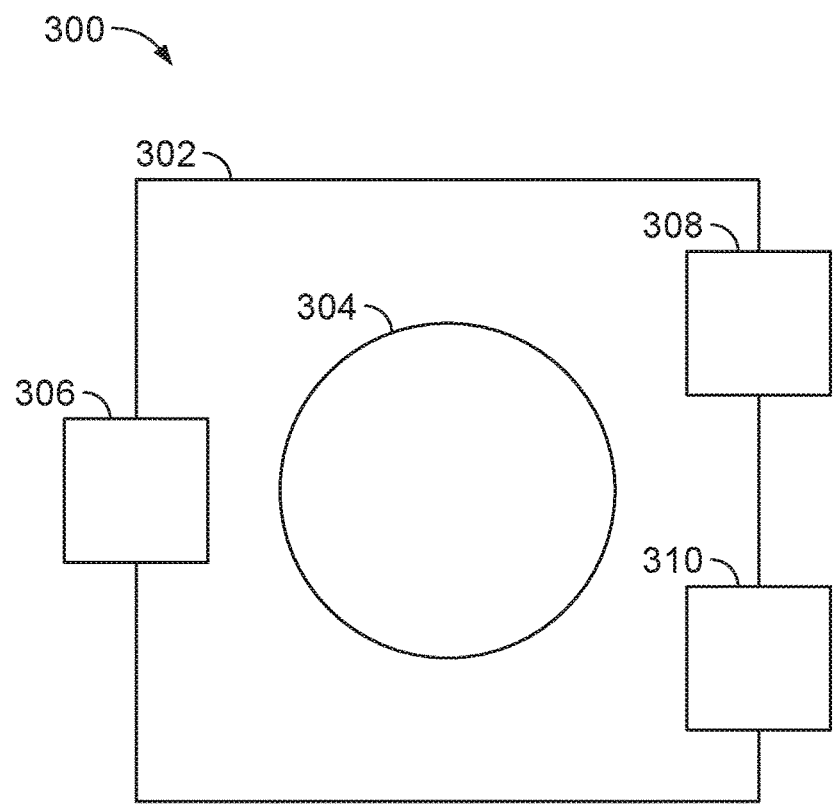
FIG. 3A is a block diagram illustrating a plan view (e.g., a layout view looking down at the structure) of an embodiment of an initial step of a manufacturing process for a Fabry-Perot interferometer.

FIG. 3A is a block diagram illustrating a plan view (e.g., a layout view looking down at the structure) of an embodiment of an initial step of a manufacturing process for a Fabry-Perot interferometer. In some embodiments, the Fabry-Perot interferometer comprises tunable optical filter 108 of FIG. 1. In the example shown, plan view 300 shows substrate 302. In some embodiments, substrate 302 comprises a transparent substrate (e.g., glass, quartz, etc.). In some embodiments, substrate 302 comprises a non-transparent metal substrate (e.g., stainless steel, aluminum, Fe—Ni alloy with particular thermal expansion properties (e.g., Kovar™), etc.) with window. In the example shown, substrate 302 comprises aperture 304. Aperture 304 comprises an aperture to allow light to pass through substrate 302 unaffected. In some embodiments, aperture 304 is centered on the center of substrate 302. In various embodiments, aperture 304 is circular, square, octagonal, or any other appropriate shape. In some embodiments, aperture 304 comprises a hole in substrate 302. In some embodiments, aperture 304 comprises a transparent material replacing part of substrate 302. Plan view 300 shows one or more piezos (e.g., a piezoelectric actuator or mover that changes height in the event that an electric potential is placed across the piezoelectric actuator)—for example, plan view 300 shows three piezos (e.g., piezo 306, piezo 308, and piezo 310). The one or more piezos are placed in order to be able to position a top mirror relative to a bottom mirror—for example, the one or more piezos are able to adjust the distance between the mirrors or the relative angle between the planes of the mirrors. Each piezo is mounted on substrate 302. In some embodiments, each piezo is attached to substrate 302 using an adhesive. Two piezos are attached to the right side of substrate 302 and one piezo is attached to the left side of substrate 302. In various embodiments, two piezos are attached to the left side, one piezo is attached to the upper side, one piezo is attached to the lower side, piezos are evenly spaced around the substrate, or piezos are placed in any other appropriate configuration. The one or more piezos are placed extending off the edge of substrate 302. In various embodiments, the one or more piezos are placed fully on substrate 302, overhanging less than half of their area off of substrate 302, overhanging half their area off of substrate 302, overhanging more than half their area off of substrate 302, or placed in any other appropriate way. In some embodiments, each piezo is configured to move in the z-axis (e.g., into and out of the page in plan view 300) when a voltage is applied. In some embodiments, the one or more piezos each comprise a connection for an electrical signal (e.g., to apply a voltage). Each piezo comprises a piezo thickness (e.g., a nominal thickness when voltage is not applied). In some embodiments, each piezo comprises a piezo thickness tolerance (e.g., a range within which the piezo thickness is guaranteed to fall). In some embodiments, each of the one or more piezos are connected to a contact pad via a wiring. In some embodiments, a contact pad comprises a metal pad on substrate 302 for making electrical contact. In some embodiments, one contact pad is formed on substrate 302 associated with each of the one or more piezos.

Figure 3B:
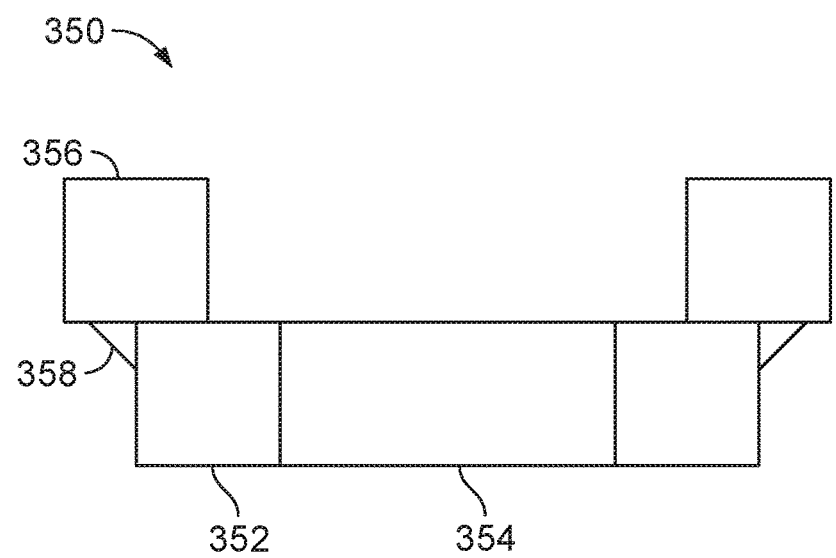
FIG. 3B is a block diagram illustrating a side view of an embodiment of an initial step of a manufacturing process for a Fabry-Perot interferometer.

FIG. 3B is a block diagram illustrating a side view of an embodiment of an initial step of a manufacturing process for a Fabry-Perot interferometer. In some embodiments, side view 350 shows a side view of the Fabry-Perot interferometer shown in plan view 300 of FIG. 3A. In the example shown, side view 350 shows substrate 352. Substrate 352 comprises aperture 354. Side view 350 comprises one or more piezos (e.g., piezo 356). Piezo 356 is attached to substrate 352 using adhesive 358. In various embodiments, adhesive 358 comprises UV cured optical adhesive. In the example shown, the one or more piezos overhang the edge of substrate 352 and are attached by their bottom side to an outside edge of substrate 352. In some embodiments, the one or more piezos are attached to a right or left side to the upper face of substrate 352.

Figure 4A:
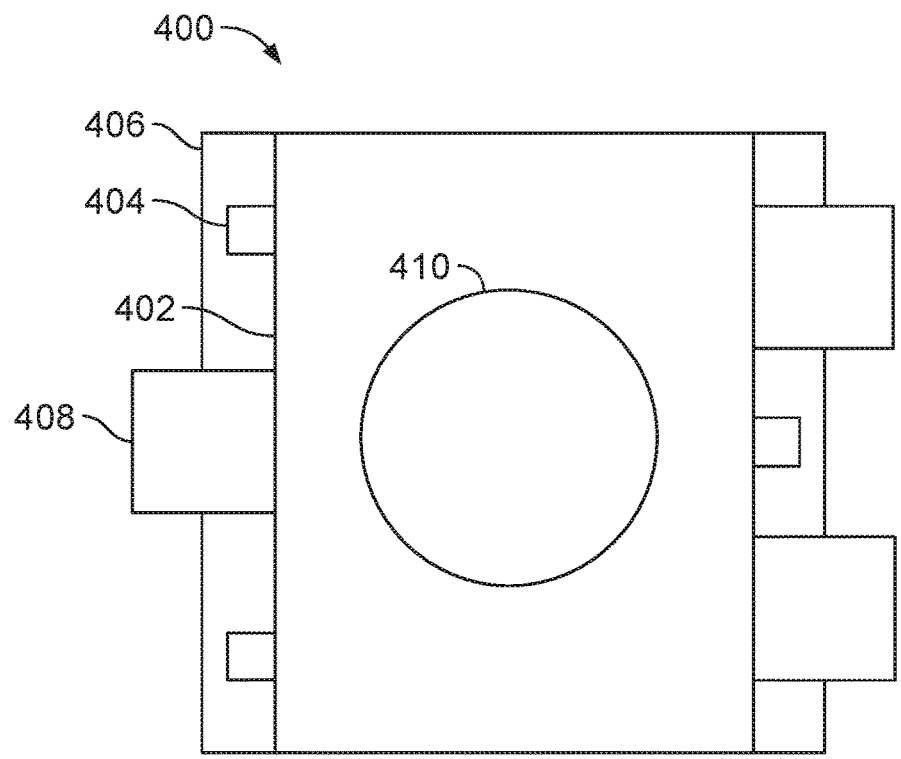
FIG. 4A is a block diagram illustrating a plan view of an embodiment of a second step of a manufacturing process for a Fabry-Perot interferometer.

FIG. 4A is a block diagram illustrating a plan view of an embodiment of a second step of a manufacturing process for a Fabry-Perot interferometer. In some embodiments, the Fabry-Perot interferometer comprises the Fabry-Perot interferometer of FIG. 3A after a second step of a manufacturing process. In the example shown, plan view 400 shows bottom mirror 402. In some embodiments, bottom mirror 402 comprises one mirror of a Fabry-Perot interferometer. Bottom mirror 402 sits on interferometer substrate 406 and is attached to interferometer substrate 406 by an adhesive (e.g., adhesive 404). In some embodiments, bottom mirror 402 is attached to interferometer substrate 406 at multiple points (e.g., at three points). Bottom mirror 402 sits on interferometer substrate 406 next to each of a set of piezos (e.g., piezo 408). In the example shown, bottom mirror 402 is rectangular (e.g., bottom mirror 402 is longer in the top to bottom direction as shown than in the left to right direction). Bottom mirror 402 comprises a bottom mirror thickness. In some embodiments, bottom mirror 402 comprises a glass layer (e.g., a glass sheet, with a height and width in plan view and a thickness not seen in plan view) with reflective layer 410. For example, reflective layer 410 comprises a mirror silvering (e.g., a layer of material for reflecting light) applied to one side. In some embodiments, the mirror silvering comprises a metal. In various embodiments, the metal comprises aluminum, titanium, silver, nickel, or any other appropriate metal.

Figure 4B:
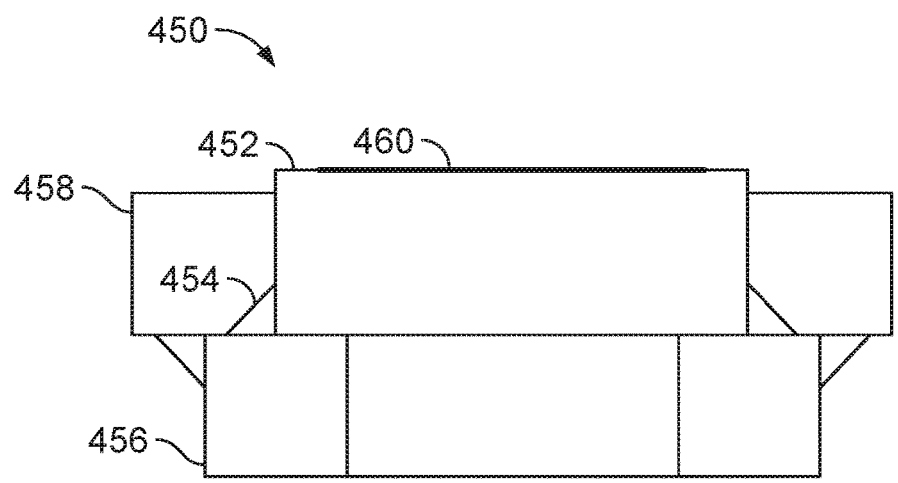
FIG. 4B is a block diagram illustrating a side view of an embodiment of a second step of a manufacturing process for a Fabry-Perot interferometer.

FIG. 4B is a block diagram illustrating a side view of an embodiment of a second step of a manufacturing process for a Fabry-Perot interferometer. In some embodiments, side view 450 comprises a side view of the Fabry-Perot interferometer shown in plan view 400 of FIG. 4A. In the example shown, bottom mirror 452 sits on interferometer substrate 456 and is attached to interferometer substrate 456 by an adhesive (e.g., adhesive 454). In some embodiments, bottom mirror 452 is attached to interferometer substrate 456 at multiple points. Bottom mirror 452 sits on interferometer substrate 456 next to each of a set of piezos (e.g., piezo 458). In the example shown, the bottom mirror thickness of bottom mirror 452 is greater than the piezo thickness of piezo 458. In some embodiments, the thickness of bottom mirror 452 is greater than the greater end of the piezo thickness tolerance of piezo 458 (e.g., the thickness of piezo 458 is guaranteed to be less than the thickness of bottom mirror 452). In the example shown, bottom mirror 452 comprises a reflective coating for reflecting light. In some embodiments, the reflective coating for reflecting light comprises mirror silvering (e.g., mirror silvering 460). In some embodiments, bottom mirror 452 comprises a glass layer with a metal coating. In some embodiments, mirror silvering 460 is on the top side of bottom mirror 452. In the example shown, mirror silvering 460 does not extend all the way to the edges of bottom mirror 452.

Figure 5A:
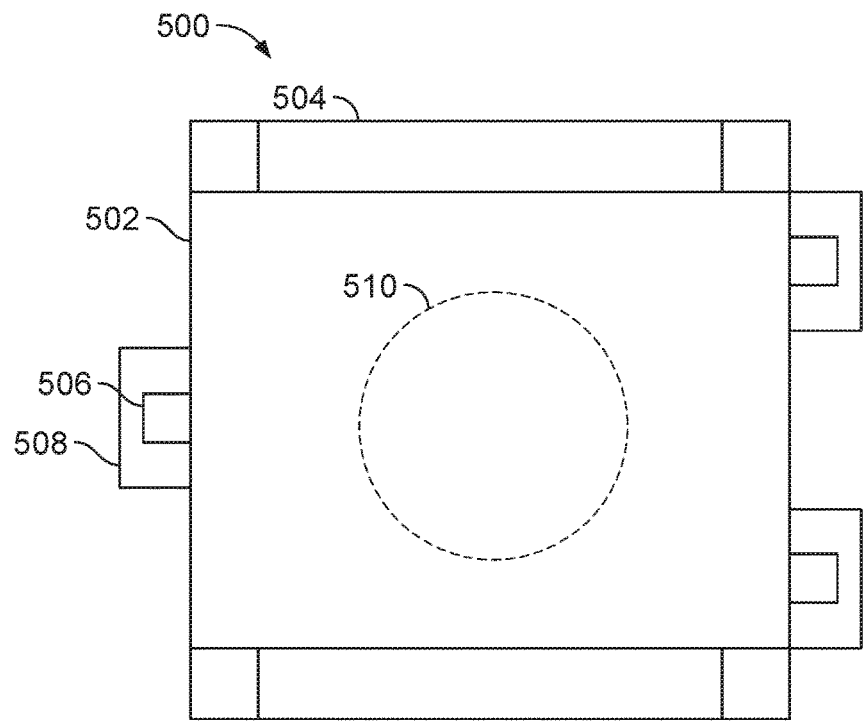
FIG. 5A is a block diagram illustrating a plan view of an embodiment of a third step of a manufacturing process for a Fabry-Perot interferometer.

FIG. 5A is a block diagram illustrating a plan view of an embodiment of a third step of a manufacturing process for a Fabry-Perot interferometer. In some embodiments, the Fabry-Perot interferometer comprises the Fabry-Perot interferometer of FIG. 4A after a third step of a manufacturing process. In the example shown, plan view 500 shows top mirror 502. In some embodiments, top mirror 502 comprises one mirror of a Fabry-Perot interferometer. Top mirror 502 is placed on bottom mirror 504. In the example shown, top mirror 502 is rectangular (e.g., top mirror 502 is longer in the left to right direction than in the top to bottom direction). In some embodiments, the top mirror 502 is placed at an orientation rotated 90 degrees relative to bottom mirror 504. In some embodiments, the length of top mirror 502 in the top to bottom direction is the same as the length of bottom mirror 504 in the left to right direction. In some embodiments, the length of top mirror 502 in the left to right direction is the same as the length of bottom mirror 504 in the top to bottom direction. In the example shown, when top mirror 502 is placed on bottom mirror 504, top mirror 502 does not touch any piezos of the previously placed set of piezos (e.g., piezo 508). The thickness of bottom mirror 504 is greater than the thickness of piezo 508. Once top mirror 502 is placed, top mirror 502 is attached to each piezo of the set of piezos by an adhesive (e.g., adhesive 506). In some embodiments, top mirror 502 can be lifted off of bottom mirror 504 by the set of piezos. In some embodiments, top mirror 502 and bottom mirror 504 each additionally comprise one or more electrodes. In some embodiments, electrodes on top mirror 502 and bottom mirror 504 form one or more capacitors whose values depends on the distance between top mirror 502 and bottom mirror 504. In some embodiments, bottom mirror 502 comprises electrical contact pads connected to the electrodes for making electrical contact to electrodes (e.g., for measuring capacitance). In some embodiments, top mirror 504 does not comprise contact pads. In some embodiments, measurement of a capacitance between top mirror 502 and bottom mirror 504 allows creation of a feedback control loop for controlling the distance between top mirror 502 and bottom mirror 504. In some embodiments, the capacitive sensors enable measurement of the plane angle between top mirror 502 and bottom mirror 504. In some embodiments, top mirror 504 comprises a glass layer (e.g., a glass sheet, with a height and width in plan view and a thickness not seen in plan view) with reflective layer 510 (e.g., on the bottom of top mirror 504). For example, reflective layer 510 comprises a mirror silvering (e.g., a layer of material for reflecting light) applied to one side. In some embodiments, the mirror silvering comprises a metal. In various embodiments, the metal comprises aluminum, titanium, silver, nickel, or any other appropriate metal.

Figure 5B:
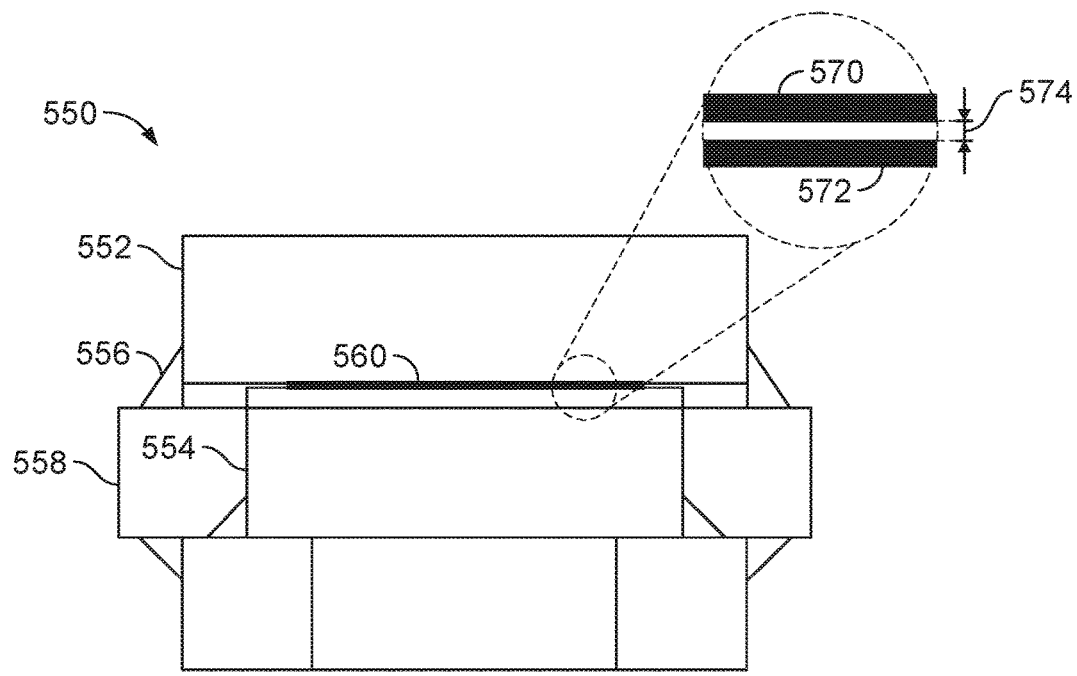
FIG. 5B is a block diagram illustrating a side view of an embodiment of a third step of a manufacturing process for a Fabry-Perot interferometer.

FIG. 5B is a block diagram illustrating a side view of an embodiment of a third step of a manufacturing process for a Fabry-Perot interferometer. In some embodiments, side view 550 shows a side view of the Fabry-Perot interferometer shown in plan view 500 of FIG. 5A. In the example shown, top mirror 552 sits on bottom mirror 554. Bottom mirror 554 extends above piezo 558 and top mirror 552 does not touch piezo 558. In various embodiments, the bottom mirror thickness is greater than the piezo thickness by an amount large enough to guarantee that tall piezos (e.g., piezo 558) are shorter than bottom mirror 554, the bottom mirror thickness is greater than the piezo thickness by amount large enough to guarantee that top mirror 552 lies flat on bottom mirror 554, the bottom mirror thickness is greater than the piezo thickness by amount large enough to guarantee that top mirror 552 does not touch the one or more piezos, or the bottom mirror thickness is greater than the piezo thickness by any other appropriate amount. Adhesive 556 attaches top mirror 552 to piezo 558, partially filling the gap between them. In the example shown, top mirror 552 comprises a reflective coating for reflecting light. In some embodiments, the reflective coating comprises mirror silvering 560. In the example shown, mirror silvering 560 is on the bottom side of top mirror 552 and placed against the mirror silvering of bottom mirror 554. In the example shown, mirror silvering 560 does not extend all the way to the edges of top mirror 552. In some embodiments, top mirror 552 lying flat on bottom mirror 554 indicates mirror silvering 560 of top mirror 552 is in contact with the mirror silvering of bottom mirror 554. In some embodiments, top mirror 552 is separated from bottom mirror 554 (e.g., top mirror 570 is held at a gap 574 above bottom mirror 572 using piezos as shown in the exploded view circle). In some embodiments, top mirror is supported by one or more piezos (e.g., piezo 558) and separated by an adjustable distance from bottom mirror 554. For example, height of piezo 558 is below the height of bottom mirror 554.

Figure 6A:
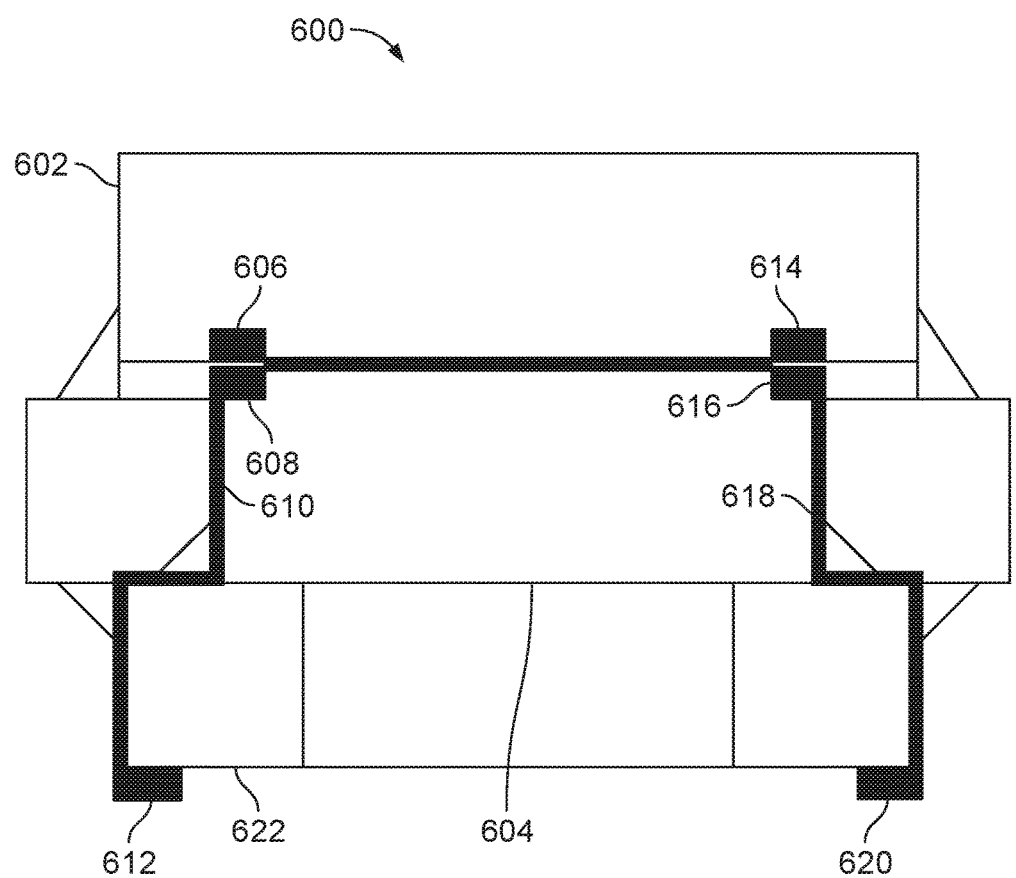
FIG. 6A is a block diagram illustrating a side view of an embodiment of a Fabry-Perot interferometer including electrodes, wiring, and contact pads.

FIG. 6A is a block diagram illustrating a side view of an embodiment of a Fabry-Perot interferometer including electrodes, wiring, and contact pads. In some embodiments, side view 600 comprises the side view of FIG. 5B including electrodes, wiring, and contact pads. In the example shown, top mirror 602 comprises top electrode 606 and top electrode 614, and bottom mirror 604 comprises bottom electrode 608 and bottom electrode 616. In various embodiments, the Fabry-Perot interferometer of FIG. 6 comprises one, two, three, four, or any other appropriate number of top electrodes. In various embodiments, the Fabry-Perot interferometer of FIG. 6 comprises one, two, three, four, or any other appropriate number of bottom electrodes. In various embodiments, electrodes are formed by depositing and etching metal, by etching a trench in the mirror surface, filling the trench with metal, and planarizing the surface, by depositing and patterning multiple metal layers, or in any other appropriate way. Contact pad 612 is connected to bottom electrode 608 using wiring 610, and contact pad 620 is connected to bottom electrode 616 using wiring 618. In various embodiments, wiring 610 and wiring 618 comprise vias through bottom mirror 604, metallization around the side of bottom mirror 604, wire bonds, or any other appropriate wiring. Top electrode 606 and bottom electrode 608 form a capacitor, the capacitance of which can be measured to determine the mirror spacing at their location. Top electrode 614 and bottom electrode 616 form a capacitor, the capacitance of which can be measured to determine the mirror spacing at their location. In some embodiments, the capacitance between a top electrode and a bottom electrode is measured by forming contact pads on top mirror 602 and bottom mirror 604, wiring the contact pads to the electrodes, and connecting an external measurement device to the contact pads. In some embodiments, top mirror 602 is allowed to move and is not connected to external wiring. A measurement can be made by forming multiple electrodes on bottom mirror 604 (e.g., bottom electrode 608 and bottom electrode 616) connected to multiple contact pads (e.g., contact pad 612 and contact pad 620). The capacitance measured between contact pad 612 and contact pad 620 then comprises a measurement of the capacitance between top electrode 606 and bottom electrode 608 and the capacitance between top electrode 614 and bottom electrode 616 wired in series. In some embodiments, contact pads are connected to electrodes of top mirror 602 and contact pads are not connected to electrodes of bottom mirror 604. In the example shown, contact pad 612 and contact pad 620 are formed on the bottom side of interferometer substrate 622. In various embodiments, contact pad 612 and contact pad 620 are formed on the bottom side of interferometer substrate 622, on the side edges of interferometer substrate 622, on the top side of interferometer substrate 622, or in any other appropriate location. In some embodiments, an electrode on top mirror 602 overlaps a pair of electrodes on bottom mirror 604. In some embodiments, the overlapping electrodes form two capacitors connected in series and each of the bottom electrodes is connected to external control electronics via wirebonding or other method.

Figure 6B:
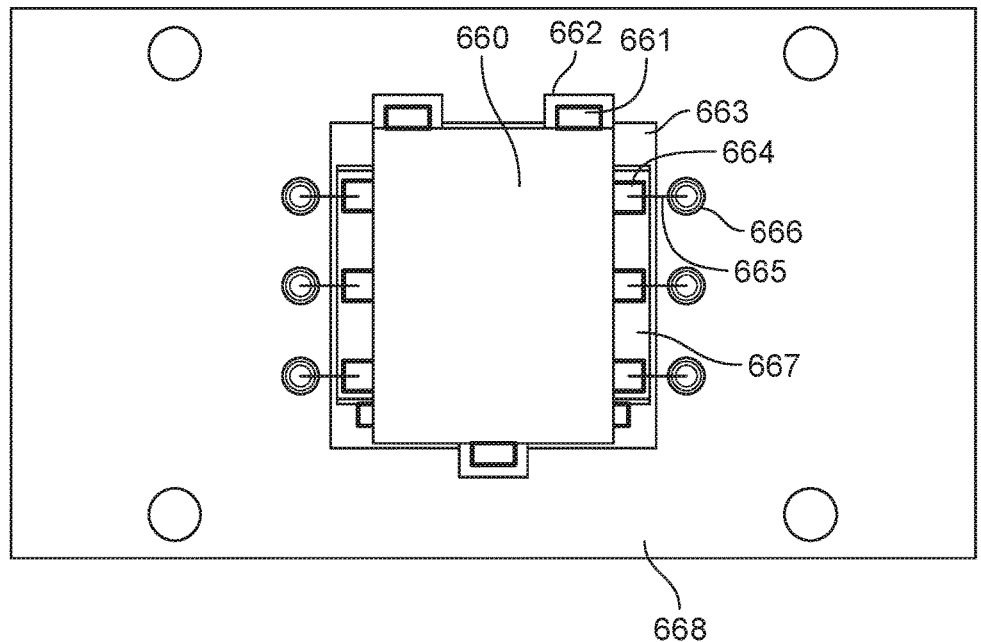
FIG. 6B is a block diagram illustrating a plan view of an embodiment of a Fabry-Perot interferometer including electrodes, wiring, and contact pads.

FIG. 6B is a block diagram illustrating a plan view of an embodiment of a Fabry-Perot interferometer including electrodes, wiring, and contact pads. In some embodiments, the plan view of FIG. 6B comprises the side view of FIG. 6C including electrodes, wiring, and contact pads. In the example shown, top mirror 660 comprises one or more top electrodes (not shown) attached to piezo 662 using adhesive 661. Top mirror 660 is supported by piezo 662 from substrate 663. Bottom mirror 667 comprises one or more bottom electrodes (not shown) that are electrically coupled to contact pad 664, wire 665 and post 666. In various embodiments, the Fabry-Perot interferometer of FIG. 6B comprises one, two, three, four, or any other appropriate number of top electrodes. In various embodiments, the Fabry-Perot interferometer of FIG. 6B comprises one, two, three, four, or any other appropriate number of bottom electrodes. In various embodiments, electrodes are formed by depositing and etching metal, by etching a trench in the mirror surface, filling the trench with metal, and planarizing the surface, by depositing and patterning multiple metal layers, or in any other appropriate way. Contact pads (e.g., contact pad 664) is connected to a bottom electrode (e.g., 6 shown in FIG. 6B) using wiring (e.g., wire 665) to a post (e.g., post 666). Posts are mounted on board 668. Top electrodes and bottom electrodes form one or more capacitors, the capacitance of which can be measured to determine the mirror spacing and relative angular orientation (e.g., between the top mirror and bottom mirror). In some embodiments, top mirror 660 is enabled to move (e.g., using three piezos—for example piezo 662) and is not connected to external wiring. A measurement can be made by forming multiple electrodes on bottom mirror 667 connected to multiple contact pads (e.g., contact pad 664). The capacitance measured between contact pads measures the capacitance between a bottom electrode and top electrode and another bottom electrode (e.g., a capacitance in series). In some embodiments, contact pads are connected to electrodes of top mirror 660 and contact pads are not connected to electrodes of bottom mirror 667.

Figure 6C:
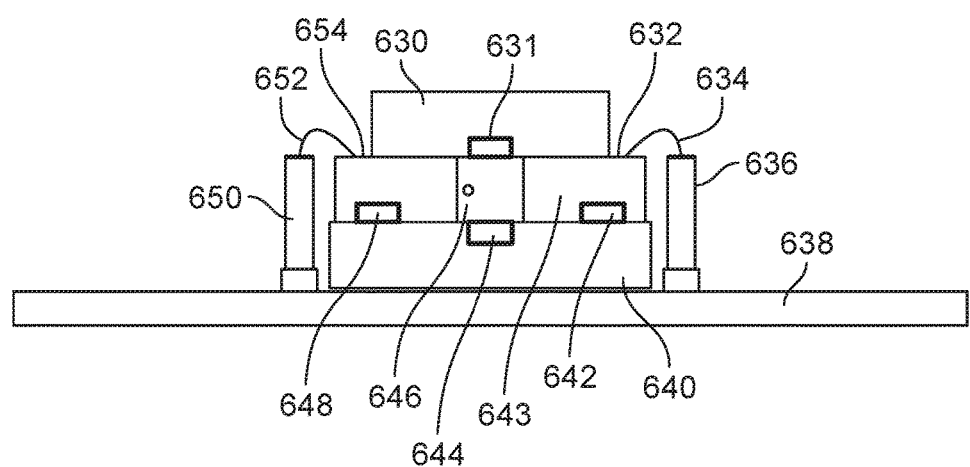
FIG. 6C is a block diagram illustrating a side view of an embodiment of a Fabry-Perot interferometer including electrodes, wiring, and contact pads.

FIG. 6C is a block diagram illustrating a side view of an embodiment of a Fabry-Perot interferometer including electrodes, wiring, and contact pads. In some embodiments, the side view of FIG. 6C comprises the plan view of FIG. 6B including electrodes, wiring, and contact pads. In the example shown, top mirror 630 comprises one or more top electrodes (not shown) attached to piezo 646 using adhesive 631. Top mirror 630 is supported by piezo 646 from substrate 640. Piezo 646 is attached to substrate 640 using adhesive 644. Bottom mirror 643 comprises one or more bottom electrodes (not shown) that are electrically coupled to a contact pad (e.g., contact pad 632 and contact pad 654), a wire (e.g., wire 634 and wire 652), and a post (e.g., post 636 and post 650). In various embodiments, the Fabry-Perot interferometer of FIG. 6C comprises one, two, three, four, or any other appropriate number of top electrodes. In various embodiments, the Fabry-Perot interferometer of FIG. 6C comprises one, two, three, four, or any other appropriate number of bottom electrodes. In various embodiments, electrodes are formed by depositing and etching metal, by etching a trench in the mirror surface, filling the trench with metal, and planarizing the surface, by depositing and patterning multiple metal layers, or in any other appropriate way. Contact pads (e.g., contact pad 632 and contact pad 654) is connected to a bottom electrode (e.g., 6 electrodes shown in FIG. 6B) using wiring (e.g., wire 634 or wire 652) to a post (e.g., post 636 or post 650). Posts are mounted on board 638. Top electrodes and bottom electrodes form one or more capacitors, the capacitance of which can be measured to determine the mirror spacing and relative angular orientation (e.g., between the top mirror and bottom mirror). In some embodiments, top mirror 630 is enabled to move (e.g., using three piezos—for example piezo 646) and is not connected to external wiring. A measurement can be made by forming multiple electrodes on bottom mirror 643 connected to multiple contact pads (e.g., contact pad 632 or contact pad 654). The capacitance measured between contact pads measures the capacitance between a bottom electrode and top electrode and another bottom electrode (e.g., a capacitance in series). In some embodiments, contact pads are connected to electrodes of top mirror 630 and contact pads are not connected to electrodes of bottom mirror 643.

Figure 7A:
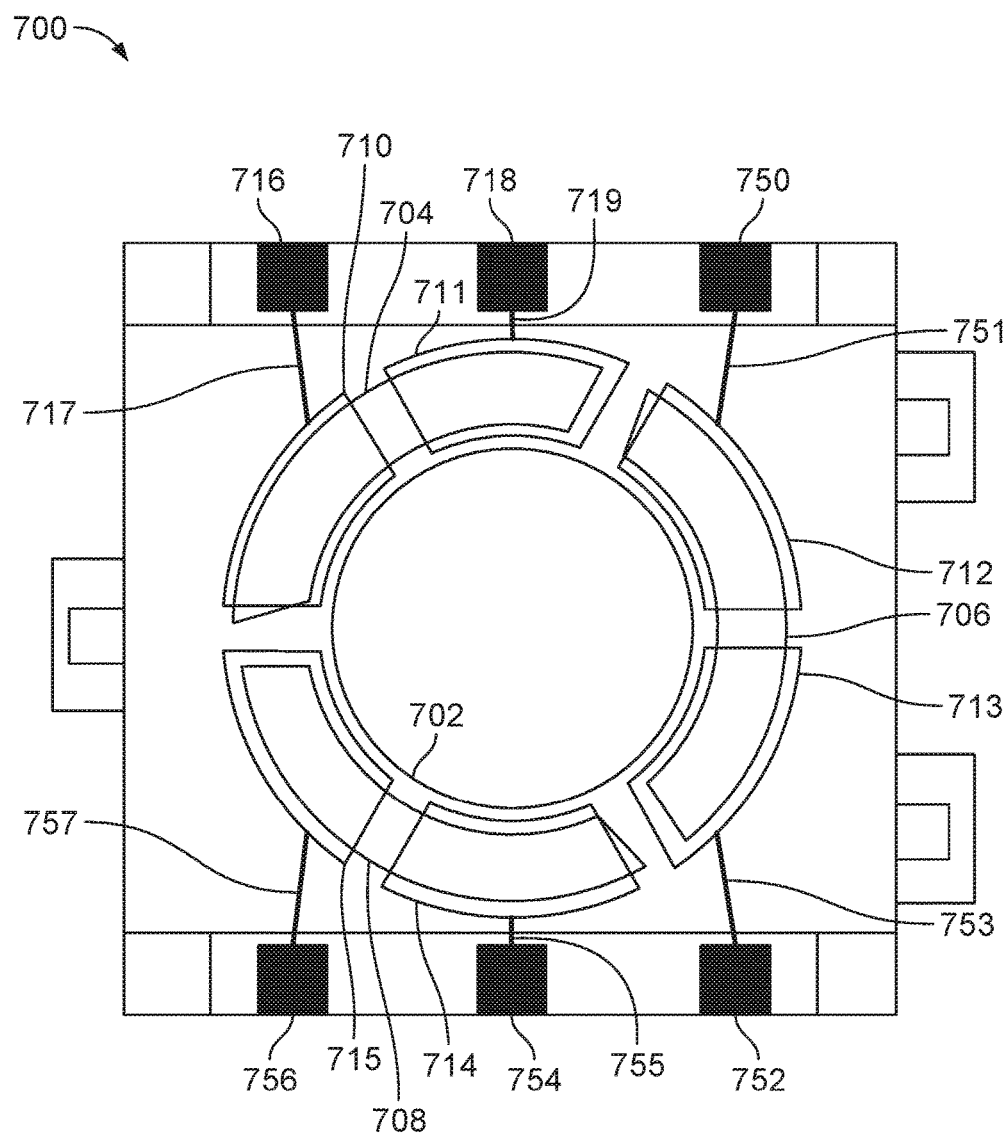
FIG. 7A is a block diagram illustrating a plan view of an embodiment of a Fabry-Perot interferometer including electrodes, wiring, and contact pads.

FIG. 7A is a block diagram illustrating a plan view of an embodiment of a Fabry-Perot interferometer including mirrors, electrodes, wiring, and contact pads. In some embodiments, plan view 700 comprises a plan view of the Fabry-Perot interferometer shown in side view 600 of FIG. 6. In the example shown, plan view 700 shows window 702 (e.g., a window in the substrate of the Fabry-Perot interferometer) to allow light to pass through the substrate. Plan view 700 shows top electrode 704, top electrode 706, and top electrode 708 that are on the top mirror that is held in place using adhesive to three piezos (e.g., one shown at the shorter left edge and two shown at the shorter right edge of the rectangular top mirror with the longer rectangular edges shown at the top and bottom in the plan view). Plan view 700 shows bottom electrode 710 and bottom electrode 711 that overlaps top electrode 704, bottom electrode 712 and bottom electrode 713 that overlaps top electrode 706, and bottom electrode 714 and bottom electrode 715 that overlaps top electrode 708. Each bottom electrode is on the top surface of a bottom mirror where the contact pads are shown on the top surface of the top edge of the rectangular bottom mirror and the top surface of the bottom edge of the rectangular bottom mirror in plan view so that the contract pads are not covered over by the top mirror (e.g., the top mirror is a rectangle that is rotate 90 degrees with respect to the bottom mirror that is a rectangle). Each bottom electrode is connected to a contact pad via electrical wiring (e.g., bottom electrode 710 is connected to contact pad 716 via electrical wiring 717; bottom electrode 711 is connected to contact pad 718 via electrical wiring 719; bottom electrode 712 is connected to contact pad 750 via electrical wiring 751; bottom electrode 713 is connected to contact pad 752 via electrical wiring 753; bottom electrode 714 is connected to contact pad 754 via electrical wiring 755; bottom electrode 715 is connected to contact pad 756 via electrical wiring 757). Each bottom and top electrode (e.g., top electrode 704, top electrode 706, top electrode 708, bottom electrode 710, bottom electrode 711, bottom electrode 712, bottom electrode 713, bottom electrode 714, and bottom electrode 715) comprises the shape of an annular sector, the bottom electrodes together forming a lower ring and the top electrodes together forming an upper ring. Each top electrode occupies just less than 120 degrees of the circular ring (e.g., about ⅓ of the circle). Each bottom electrode occupies just less than 60 degrees of the circular ring (e.g., about ⅙ of the circle). Capacitances can be measured between a pair of bottom electrodes by making contact via their associated electrodes. The capacitance measured between a pair of bottom electrodes comprises a pair of capacitances in series, from the bottom electrode to the top electrode to the other bottom electrode (e.g., the measured capacitance between bottom electrode 710 and bottom electrode 711 comprises the capacitance between bottom electrode 710 and top electrode 704 in series with the capacitance between top electrode 704 and bottom electrode 711). Three capacitance measurements can be made in this way (e.g., capacitance from bottom electrode 710 to bottom electrode 711, capacitance from bottom electrode 712 to bottom electrode 713, and capacitance from bottom electrode 714 to bottom electrode 715). The three measurements correlate to three different distance measurements from a bottom mirror to a top mirror and provide enough information to control a feedback system to position the top mirror relative to the bottom mirror (e.g., using piezos to control the vertical position of the top mirror).

Figure 7B:
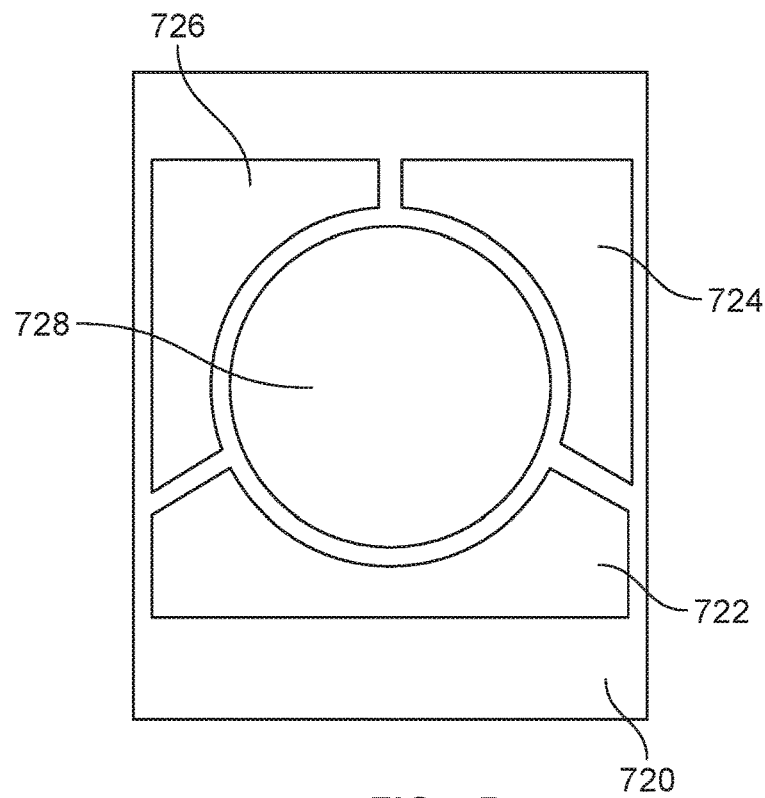
FIG. 7B is a block diagram illustrating a plan view of an embodiment of a top mirror.

FIG. 7B is a block diagram illustrating a plan view of an embodiment of a top mirror. In some embodiments, plan view of FIG. 7B comprises a plan view of the Fabry-Perot interferometer shown in side view 600 of FIG. 6A or side view of FIG. 6C. In the example shown, plan view shows top mirror 720. The surface of top mirror 720 includes electrode 722, electrode 724, and electrode 726 as well as reflective coating 728. Each electrode forms a pair of capacitors with two electrodes on a bottom mirror so that distance between the top mirror and bottom mirror can be measured. The three electrode configuration enables distance and planar angle between the top mirror and bottom mirror to be measured. Reflective coating 728 comprises one or more of the following: a metal coating (e.g., silver, aluminum, titanium, silver, nickel, etc.), a dielectric coating (e.g., a reflecting stack of dielectrics with reflective characteristics across a range of wavelengths), or any other appropriate coating.

Figure 7C:
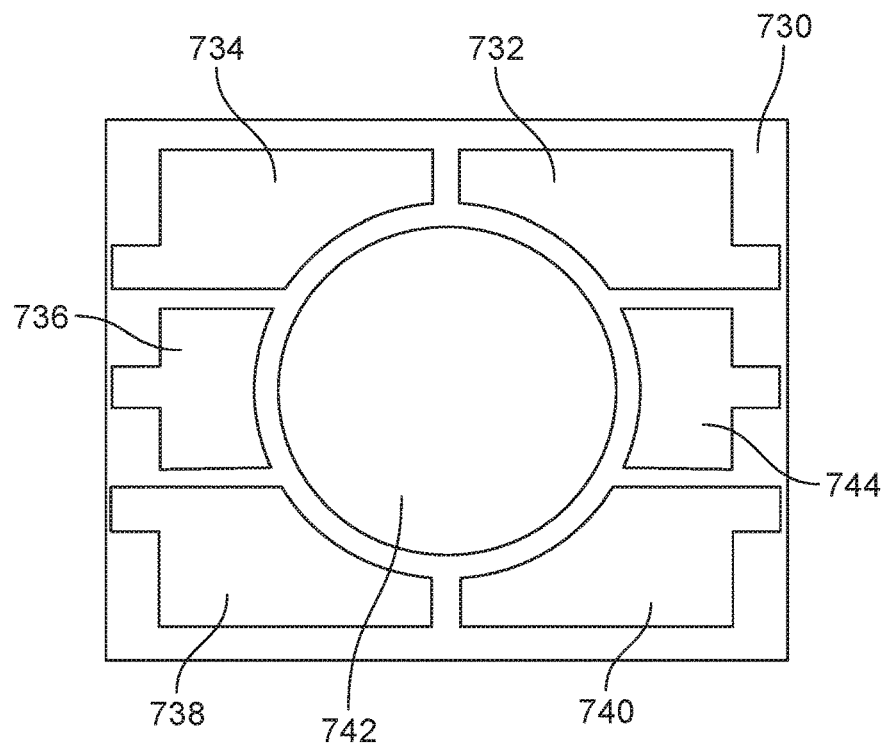
FIG. 7C is a block diagram illustrating a plan view of an embodiment of a bottom mirror.

FIG. 7C is a block diagram illustrating a plan view of an embodiment of a bottom mirror. In some embodiments, plan view of FIG. 7C comprises a plan view of the Fabry-Perot interferometer shown in side view 600 of FIG. 6A or side view of FIG. 6C. In the example shown, plan view shows bottom mirror 730. The surface of bottom mirror 730 includes electrode 732, electrode 734, electrode 736, electrode 738, electrode 740, and electrode 744 as well as reflective coating 742. Pairs of electrode form a capacitor with two electrodes on a top mirror so that distance between the top mirror and bottom mirror can be measured. For example, electrode 732 and electrode 744 form a pair of capacitors with a top mirror electrode (e.g., electrode 724 of FIG. 7B); electrode 734 and electrode 736 form a pair of capacitors with a top mirror electrode (e.g., electrode 726 of FIG. 7B); and electrode 738 and electrode 740 form a pair of capacitors with a top mirror electrode (e.g., electrode 722 of FIG. 7B). The three electrode configuration enables distance and planar angle between the top mirror and bottom mirror to be measured. Wire connections to the electrodes on bottom mirror 730 can be attached to the tabs of the electrodes at the left edge and right edge of bottom mirror 730 (which are not covered over by a top mirror as the rectangular mirrors are rotated 90 degrees with respect to each other). Reflective coating 742 comprises one or more of the following: a metal coating (e.g., silver, aluminum, titanium, silver, nickel, etc.), a dielectric coating (e.g., a reflecting stack of dielectrics with reflective characteristics across a range of wavelengths), or any other appropriate coating.

Figure 8A:
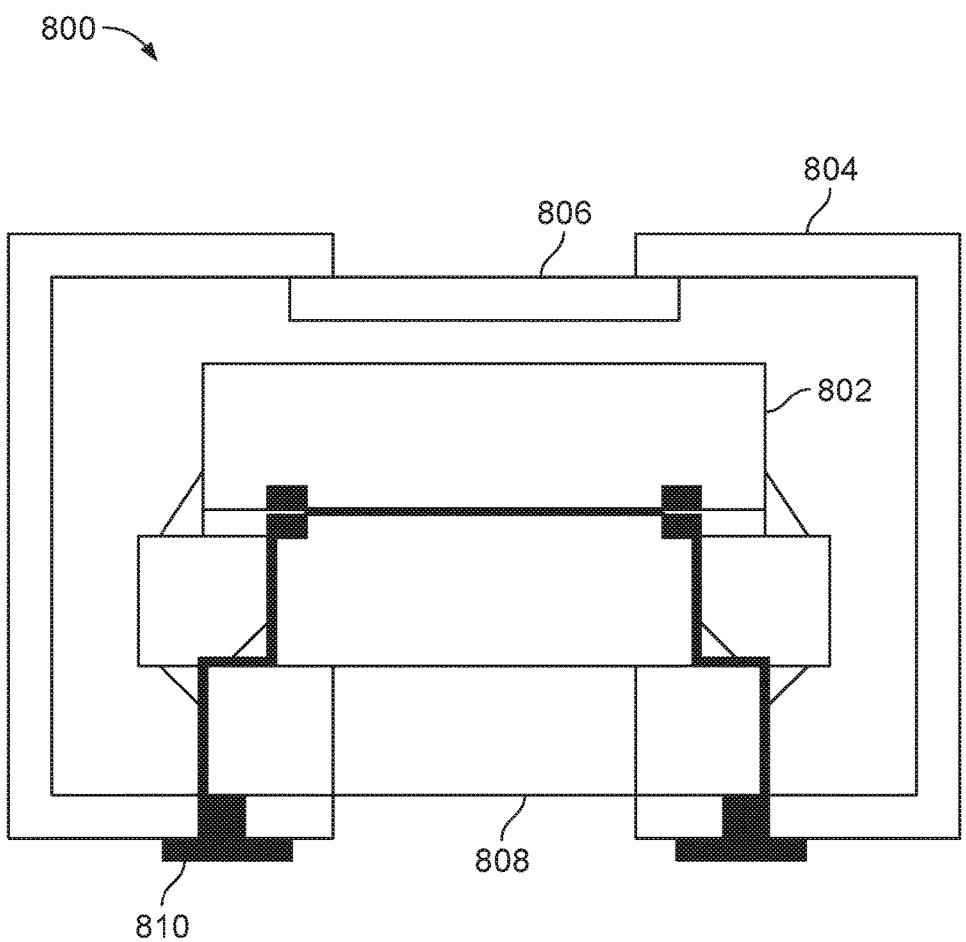
FIG. 8A is a block diagram illustrating a side view of an embodiment of a Fabry-Perot interferometer enclosed in a package.

FIG. 8A is a block diagram illustrating a side view of an embodiment of a Fabry-Perot interferometer enclosed in a package. In some embodiments, side view 800 comprises the Fabry-Perot interferometer of side view 600 of FIG. 6A or side view of FIG. 6C enclosed in a package. In the example shown, Fabry-Perot interferometer 802 is enclosed in package 804. In various embodiments, package 804 comprises a metal encasing, a plastic encasing, a resin encasing, a glass encasing, or any other appropriate package for protecting Fabry-Perot interferometer 802. Package 804 comprises an upper gap including window 806 for allowing light to travel to and from the upper side of Fabry-Perot interferometer 802. Package 804 additionally comprises lower gap 808 for allowing light to travel to and from the lower side of Fabry-Perot interferometer 802. Contact pad 810 comprises a contact pad on the outside of package 804 wired (e.g., via a hole through package 804) to an electrode on the bottom mirror. In some embodiments, each electrode on the bottom mirror is wired to a contact on the outside of package 804.

Figure 8B:
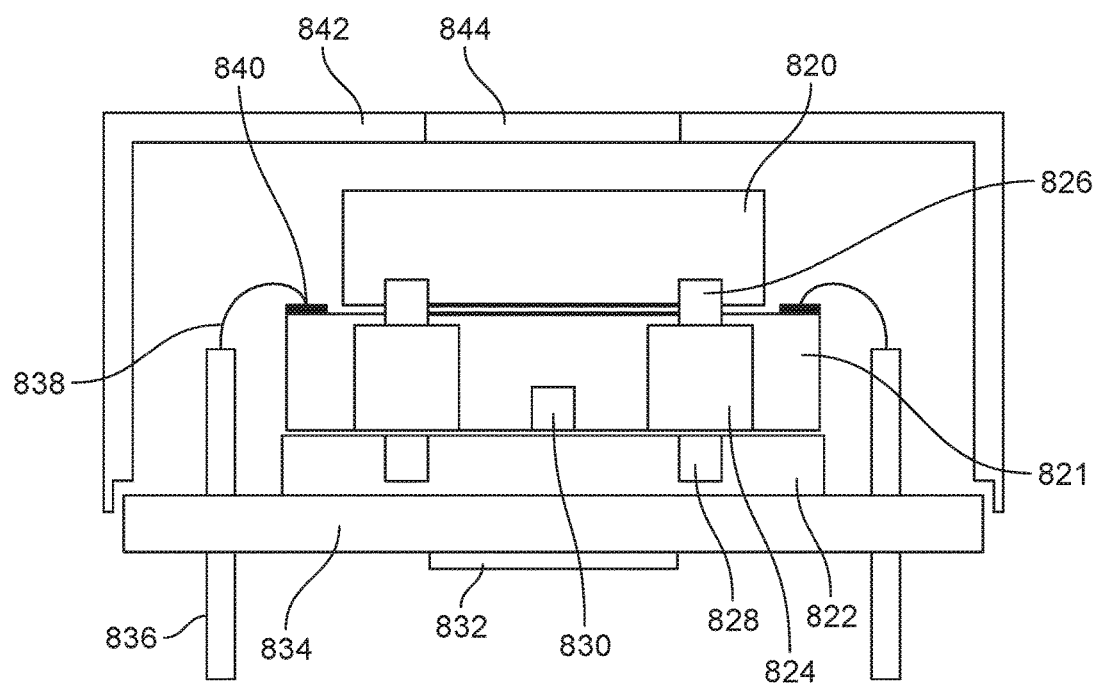
FIG. 8B is a block diagram illustrating a side view of an embodiment of a Fabry-Perot interferometer enclosed in a package.

FIG. 8B is a block diagram illustrating a side view of an embodiment of a Fabry-Perot interferometer enclosed in a package. In some embodiments, side view of FIG. 8B comprises the Fabry-Perot interferometer of side view 600 of FIG. 6A or side view of FIG. 6C enclosed in a package. In the example shown, top mirror 820 is held in position over bottom mirror 821 using three or more piezos (e.g., piezo 824 that is attached to top mirror 820 using adhesive 826 and attached to substrate 822 using adhesive 828). Bottom mirror 821 is attached to substrate 822 using adhesive 830. The three or more piezos enable top mirror 820 to be moved to an adjustable distance from bottom mirror 821 to make an optically tunable filter—a Fabry-Perot etalon or interferometer. In some embodiments, light entering window 844 is reflected or transmitted depending on the wavelength and the distance between the reflecting surface of the top mirror and the bottom mirror and light exits window 832. In some embodiments, light entering window 832 is reflected or transmitted depending on the wavelength and the distance between the reflecting surface of the top mirror and the bottom mirror and light exits window 844. Substrate 822 is attached to package bottom 834. Electrodes on mirror bottom 821 are electrically connect by attaching wires to pads (e.g., wire 838 connecting to pad 840) that are then attached to post or pin 836 that can be attached on the exterior of the package. Package top 842 and package bottom 834 form a sealed enclosure around the tunable optical filter to keep contaminants out of the filter.

In various embodiments, package 804 comprises a metal encasing, a plastic encasing, a resin encasing, a glass encasing, or any other appropriate package for protecting Fabry-Perot interferometer 802. Package 804 comprises an upper gap including window 806 for allowing light to travel to and from the upper side of Fabry-Perot interferometer 802. Package 804 additionally comprises lower gap 808 for allowing light to travel to and from the lower side of Fabry-Perot interferometer 802. Contact pad 810 comprises a contact pad on the outside of package 804 wired (e.g., via a hole through package 804) to an electrode on the bottom mirror. In some embodiments, each electrode on the bottom mirror is wired to a contact on the outside of package 804.

In some embodiments, a tunable optical filtering device comprises a substrate, one or more piezos, a bottom mirror, and a top mirror. The one or more piezos are placed on the substrate, wherein the one or more piezos each have a bottom surface on the substrate and a top piezo surface. The bottom mirror is placed on the substrate, wherein the bottom mirror has a bottom mirror top surface, wherein each top piezo surface is closer to the substrate than the top surface of the bottom mirror. The top mirror is placed on the bottom mirror, wherein the top mirror is attached to the one or more piezos, wherein the top mirror is not on the one or more piezos when the top mirror is placed on the bottom mirror.

Figure 8C:
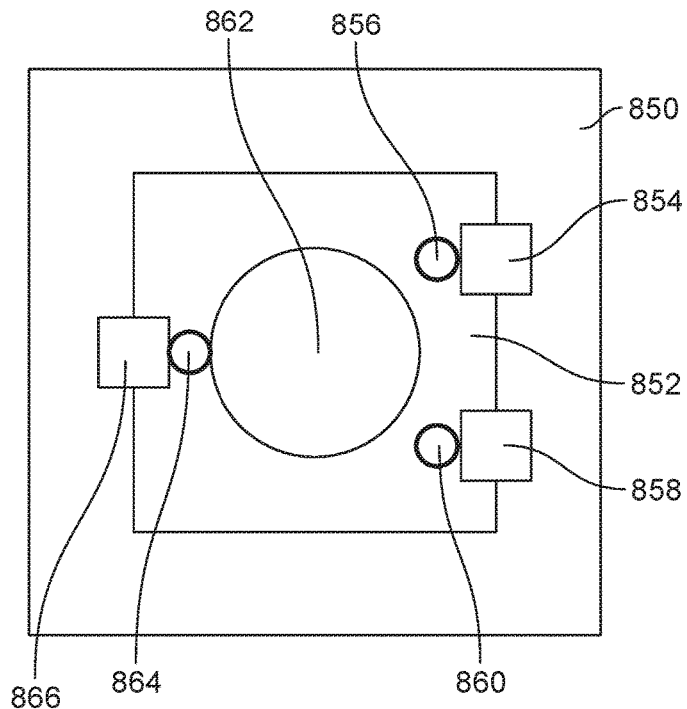
FIG. 8C is a block diagram illustrating an embodiment of a plan view of a design for a support for bottom mirror.

FIG. 8C is a block diagram illustrating an embodiment of a plan view of a design for a support for bottom mirror. In some embodiments, the piezos are guaranteed to be below the top mirror thickness or height by adding spacers on the substrate. In the example shown, substrate 850 has window 862. Piezos (e.g., piezo 854, piezo 858, and piezo 866) are attached to substrate 850 using an adhesive. Spacers (e.g., spacer 856, spacer 860, and spacer 864) raise the profile height of a bottom mirror so that a top mirror lays flat on the bottom mirror and does not lay on the piezos (e.g., for assembly).

Figure 8D:
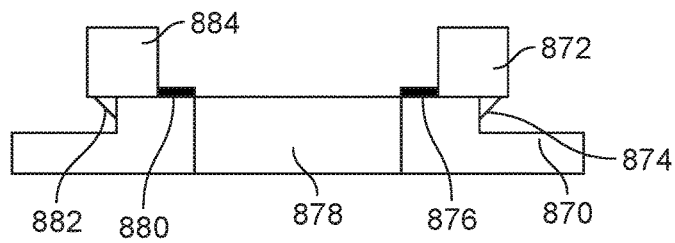
FIG. 8D is a block diagram illustrating an embodiment of a side view of a design for a support for bottom mirror.

FIG. 8D is a block diagram illustrating an embodiment of a side view of a design for a support for bottom mirror. In some embodiments, the piezos are guaranteed to be below the top mirror thickness or height by adding spacers on the substrate. In the example shown, substrate 870 has window 878. Piezos (e.g., piezo 872 and piezo 884) are attached to substrate 870 using an adhesive (e.g., adhesive 874 and adhesive 882). Spacers (e.g., spacer 876, and spacer 880) raise the profile height of a bottom mirror so that a top mirror lays flat on the bottom mirror and does not lay on the piezos (e.g., for assembly).

In some embodiments, the spacer is 100 microns in height or thickness. In some embodiments, the spacer is deposited.

Figure 8E:
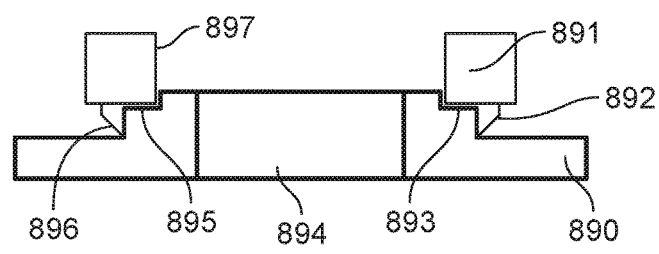
FIG. 8E is a block diagram illustrating an embodiment of a side view of a design for a support for bottom mirror.

FIG. 8E is a block diagram illustrating an embodiment of a side view of a design for a support for bottom mirror. In some embodiments, the piezos are guaranteed to be below the top mirror thickness or height by lowering piezos by making a depression on the substrate. In the example shown, substrate 890 has window 894. Piezos (e.g., piezo 891 and piezo 897) are attached to substrate 890 using an adhesive (e.g., adhesive 892 and adhesive 896). Depressions (e.g., depression 893 and depression 895) lower the profile height of a piezo so that a top mirror lays flat on the bottom mirror and does not lay on the piezos (e.g., for assembly).

In some embodiments, the depression is 100 microns below the surface of the substrate. In some embodiments, the depression is achieve by attaching a step to rest the piezo on, wherein the step comprises a part of the substrate. In various embodiments, the depression is machined, etched from the substrate, or any other appropriate manner of achieving a depression.

Figure 9:
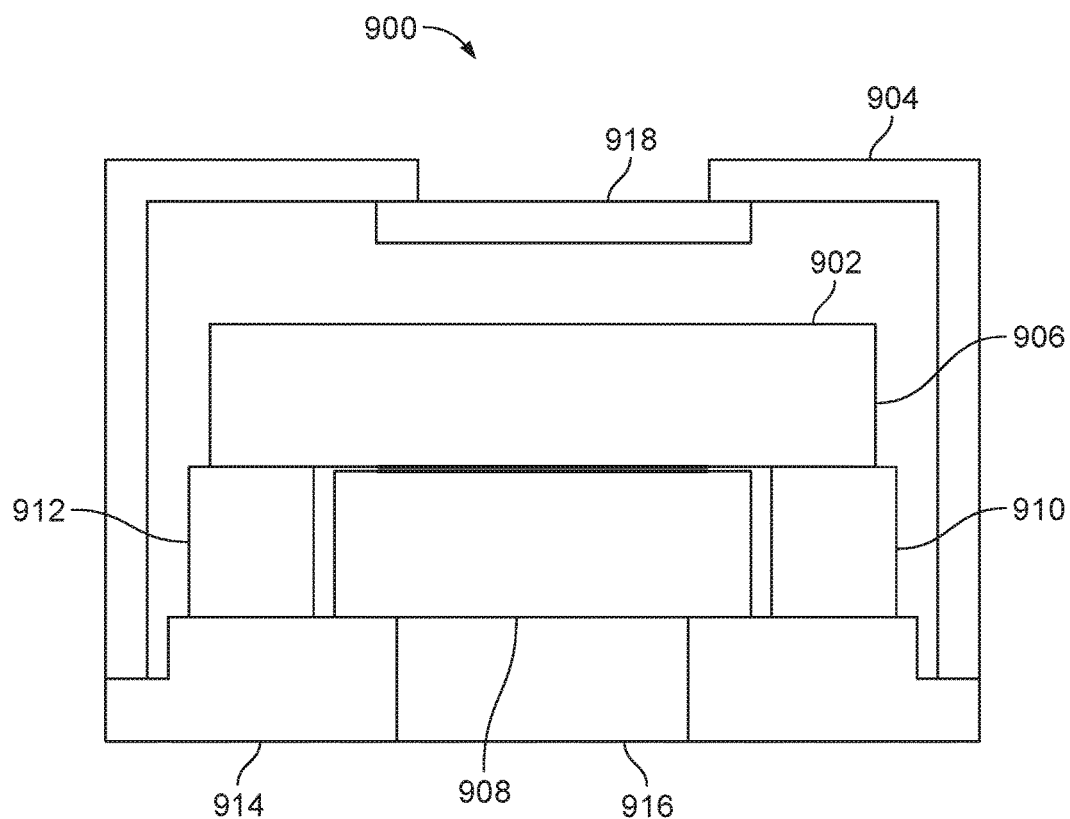
FIG. 9 is a block diagram illustrating an embodiment of a side view of an alternate design for a Fabry-Perot interferometer enclosed in a package.

FIG. 9 is a block diagram illustrating an embodiment of a side view of an alternate design for a Fabry-Perot interferometer enclosed in a package. In some embodiments, side view 900 comprises an alternate design for a Fabry-Perot interferometer enclosed in the package of FIG. 8. In the example shown, Fabry-Perot interferometer 902 is enclosed in package 904. In various embodiments, package 904 comprises a metal encasing, a plastic encasing, a resin encasing, a glass encasing, or any other appropriate package for protecting Fabry-Perot interferometer 902. Fabry-Perot interferometer 902 comprises bottom mirror 908, top mirror 906, piezo 910, piezo 912, and substrate 914. In various embodiments, substrate 914 is made from metal, glass, quartz, silicon, plastic, or any other appropriate material. Substrate 914 includes window 916 for allowing light to reach the bottom side of Fabry-Perot interferometer 902. Package 904 comprises upper window 918 for allowing light to reach the upper side of Fabry-Perot interferometer 902. In various embodiments, upper window 918 comprises a hole in package 904, a transparent window filling a hole in package 904, a transparent region of package 904, or any other appropriate upper window.

Figure 10:
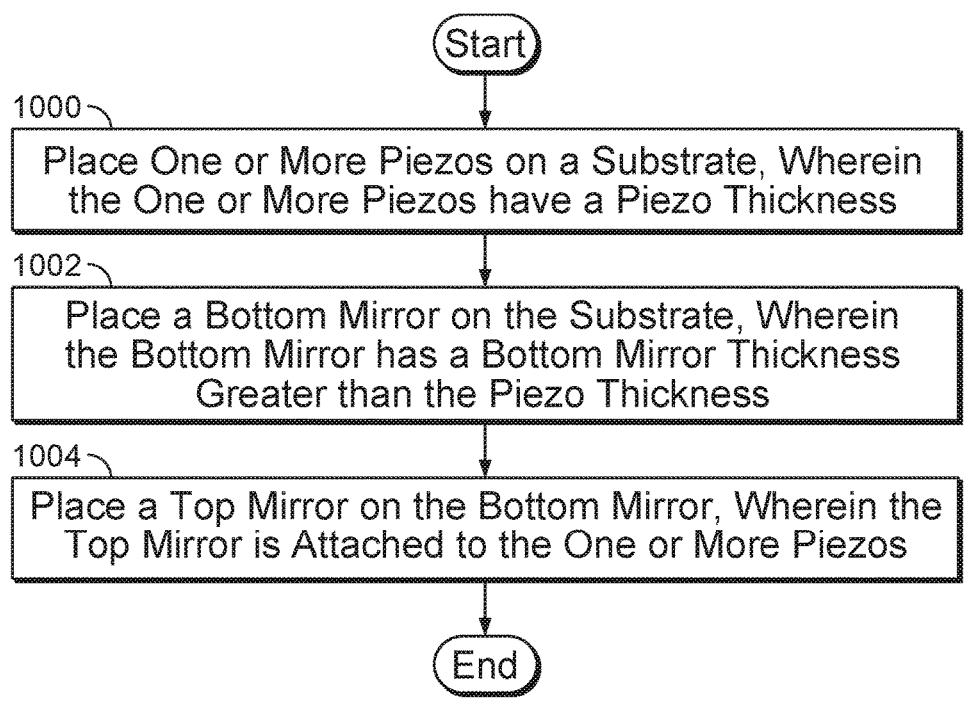
FIG. 10 is a flow diagram illustrating an embodiment of a process for a Fabry-Perot interferometer.

FIG. 10 is a flow diagram illustrating an embodiment of a process for a Fabry-Perot interferometer. In some embodiments, the process of FIG. 10 comprises a process for the Fabry-Perot interferometer of FIG. 5A and FIG. 5B. In the example shown, in 1000, one or more piezos are placed on a substrate, wherein the one or more piezos have a piezo thickness. In some embodiments, the piezos are fixed by using an adhesive to attach the piezos to the substrate. In 1002, a bottom mirror is placed on the substrate, wherein the bottom mirror has a bottom mirror thickness greater than the piezo thickness. In 1004, a top mirror is placed on the bottom mirror, wherein the top mirror is attached to the one or more piezos. For example an adhesive is used to attach the top mirror to the one or more piezos. In some embodiments, the interferometer is sealed (e.g., enclosed for protection, placed in a package, etc.). In some embodiments, the interferometer is placed in a package (e.g., for protection, handling, etc.). In some embodiments, the package comprises a window (e.g., in order to allow light to enter and exit). In various embodiments, wires are attached to pads to enable measurements of capacitance or any other sensor for measuring distance between the mirrors. In some embodiments, wires are attached to pins to enable connection to the pads from outside a package. In some embodiments, wires are attached to piezos to apply voltages to the piezos for control of the actuation. In some embodiments, the top mirror is rectangular in plan view, the bottom mirror is rectangular in plan view, and the top mirror is oriented with a 90 degree rotation in the plan view to enable placing piezos underneath the top mirror adjacent to the bottom mirror and/or electrical contact locations on the bottom mirror that are not occluded by the top mirror. In some embodiments, the tunable optical filter is placed in package after the tunable optical filter is assembled and adhesive is cured.

In some embodiments, the top mirror is 3 mm thick. In some embodiments, the bottom mirror is 3 mm thick. In some embodiments, the top mirror is between 10-12 mm×14-16 mm in plan view dimensions. In some embodiments, the bottom mirror is between 10-12 mm×14-16 mm in plan view dimensions. In some embodiments, the top mirror and the bottom mirror have the same plan view dimensions. In some embodiments, the bottom mirror and the top mirror have the same thickness or height in a side view. In some embodiments, the piezos have a 2.9 mm thickness or height in a side view. In some embodiments, the amount that the thickness for the piezos is less than the thickness of the bottom mirror enables a top mirror to be placed on top of a bottom mirror in assembly without resting on the piezos even considering variations in the production thicknesses of the piezos and/or the bottom mirror. In some embodiments, the piezos have a 3 mm×3 mm plan view dimensions. In some embodiments, the top mirror when rotate by 90 degrees from the bottom mirror in plan view leaves unoccluded or exposed space on the bottom mirror for contact pads (e.g., space for a 1 mm×1 mm contact pad, space for a 1.5 mm×1.5 mm contact pad, space for a 2 mm×2 mm contact pad, etc.).

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A device for tunable optical filtering, comprising:
a substrate;
one or more piezos, wherein the one or more piezos are placed on the substrate, wherein the one or more piezos have a piezo thickness, the piezo thickness being a length of the one or more piezos in a top to a bottom direction;
a bottom mirror, wherein the bottom mirror is placed on the substrate, wherein the bottom mirror has a bottom mirror thickness greater than the piezo thickness, the bottom mirror thickness being a bottom mirror length of the bottom mirror in the top to the bottom direction;
a top mirror, wherein the top mirror is placed on the bottom mirror, the top mirror being in contact with the bottom mirror, wherein the top mirror is attached to the one or more piezos, wherein actuation of the one or more piezos lifts the top mirror from the bottom mirror so that the top mirror is no longer in contact with the bottom mirror.

2. The device of claim 1, wherein the bottom mirror is attached to the substrate.

3. The device of claim 1, wherein the one or more piezos are attached to the substrate.

4. The device of claim 1, wherein the bottom mirror comprises a glass layer with a metal coating.

5. The device of claim 1, wherein the bottom mirror is rectangular in plan view.

6. The device of claim 1, wherein the bottom mirror comprises three or more electrical contact pads.

7. The device of claim 6, wherein the bottom mirror comprises an electrode connected to each electrical contact pad.

8. The device of claim 1, wherein the substrate comprises a transparent region.

9. The device of claim 1, wherein the bottom mirror thickness is greater than the piezo thickness by an amount greater than a piezo thickness tolerance.

10. The device of claim 1, wherein the bottom mirror thickness is greater than the piezo thickness by an amount large enough to guarantee that the one or more piezos are shorter than the bottom mirror.

11. The device of claim 1, wherein the bottom mirror thickness is greater than the piezo thickness by an amount large enough to guarantee that the top mirror lies flat on the bottom mirror.

12. The device of claim 1, wherein the bottom mirror thickness is greater than the piezo thickness by amount large enough to guarantee that the top mirror does not touch the one or more piezos.

13. The device of claim 1, wherein the one or more piezos comprise three piezos.

14. The device of claim 1, wherein the top mirror is rectangular.

15. The device of claim 1, wherein the top mirror is placed at an orientation rotated 90 degrees relative to the bottom mirror.

16. The device of claim 1, wherein the top mirror comprises three or more electrodes.

17. The device of claim 1, wherein the top mirror does not comprise an electrical contact pad.

18. The device of claim 1, wherein the top mirror is attached to the one or more piezos using adhesive.

19. The device of claim 1, wherein the one or more piezos each comprise a connection for an electrical signal.

20. The device of claim 1, further comprising a package enclosing the substrate, the one or more piezos, the bottom mirror, and the top mirror.

21. The device of claim 20, wherein the package comprises a window.

22. The device of claim 20, wherein the package is sealed.

23. A process assembling a device for tunable optical filtering, comprising:
placing one or more piezos on a substrate, wherein the one or more piezos have a piezo thickness, the piezo thickness being a length of the one or more piezos in a top to a bottom direction;
placing a bottom mirror on the substrate, wherein the bottom mirror has a bottom mirror thickness greater than the piezo thickness, the bottom mirror thickness being a bottom mirror length of the bottom mirror in the top to the bottom direction;
placing a top mirror on the bottom mirror, the top mirror being in contact with the bottom mirror, wherein the top mirror is attached to the one or more piezos, wherein actuation of the one or more piezos lifts the top mirror from the bottom mirror so that the top mirror is no longer in contact with the bottom mirror.

24. A device for tunable optical filtering, comprising:
a substrate;
one or more piezos, wherein the one or more piezos are placed on the substrate, wherein the one or more piezos each have a bottom surface on the substrate and a top piezo surface, wherein the one or more piezos have a piezo thickness, the piezo thickness being a length of the one or more piezos in a top to a bottom direction;
a bottom mirror, wherein the bottom mirror is placed on the substrate, wherein the bottom mirror has a bottom mirror top surface, wherein each top piezo surface is closer to the substrate than the top surface of the bottom mirror, wherein the bottom mirror has a bottom mirror thickness greater than the piezo thickness, the bottom mirror thickness being a bottom mirror length of the bottom mirror in a top to a bottom direction;
a top mirror, wherein the top mirror is placed on the bottom mirror, the top mirror being in contact with the bottom mirror, wherein the top mirror is attached to the one or more piezos, wherein the top mirror is not on the one or more piezos when the top mirror is placed on the bottom mirror, wherein actuation of the one or more piezos lifts the top mirror from the bottom mirror so that the top mirror is no longer in contact with the bottom mirror.

25. A device as in claim 24, wherein the bottom mirror is placed on the substrate with one or more spacers in between the substrate and the bottom mirror, wherein the one or more spacers raise the bottom mirror top surface so that each top piezo surface is closer to the substrate than the top surface of the bottom mirror.

26. A device as in claim 24, wherein each of the one or more piezos is placed on the substrate in one or more depressions of the substrate, wherein the one or more depressions lower the one or more piezos so that each top piezo surface is closer to the substrate than the top surface of the bottom mirror.

27. A device as in claim 24, wherein each of the one or more piezos is placed on the substrate in one or more depressions of the substrate, wherein the one or more depressions lower the one or more piezos so that each top piezo surface is closer to the substrate than the top surface of the bottom mirror, wherein the depression is achieved by one or more of the following: attaching a step, machining, or etching.

* * * * *